United States Patent [19]

Balk et al.

[11] Patent Number: 5,706,334
[45] Date of Patent: Jan. 6, 1998

[54] APPARATUS FOR PROVIDING A GRAPHICAL CONTROL INTERFACE

[75] Inventors: Michael W. Balk, Piscataway; Myra L. Ensor, Summit; Blaise Heltai, Westfield; Garrett Gayer Hodgson, Basking Ridge; Richard H. Janow, South Orange; Thaddeus Julius Kowalski, Summit; Agesino Primatic, Morris Plains; Michael J. Sammon, Watchung; Theodore Sizer, II, Little Silver; Thomas M. Smith, Plainfield; Eric E. Sumner, Jr., Bernardsville; Bruce A. Wallace, Short Hills, all of N.J.

[73] Assignee: Lucent Technologies Inc., Murray Hill, N.J.

[21] Appl. No.: 393,615

[22] Filed: Feb. 23, 1995

Related U.S. Application Data

[63] Continuation of Ser. No. 292,476, Aug. 18, 1994, abandoned.

[51] Int. Cl.$^6$ .................................................. H04M 1/64
[52] U.S. Cl. .............................. 379/67; 379/90; 379/96; 379/102
[58] Field of Search .................... 379/67, 88, 89, 379/90, 102, 93, 96; 348/10, 11, 12, 13, 14

[56] References Cited

U.S. PATENT DOCUMENTS 5,404,393  4/1995  Remillard ................................. 379/96
5,414,773  5/1995  Handelman ............................... 379/93
5,451,998  9/1995  Hamrick .................................... 348/14
5,461,667  10/1995  Remillard ................................ 379/96

Primary Examiner—Fan Tsang

[57] ABSTRACT

Techniques for employing a television set and a television set controller as the control interface for devices which themselves do not have display capability and for services provided via the telephone network. The techniques involve control apparatus which is connected to the telephone network and a television set and is responsive to inputs from a hand-held controller for the television set. The control apparatus outputs a screen which contains control selections to the television set and the user employs the controller to make a selection. The control apparatus then performs the control function specified by the selection. One application is a telephone messaging system: integral with the control apparatus is a system which can answer calls and store voice messages, fax messages, character-string messages, and script messages. The control apparatus plays the voice messages on the television set and provide screens to the television set which display the fax and character-string messages. The script messages contain code which the control apparatus executes to produce displays. Services provided by the telephone network are controlled and displayed analogously. The services may also involve other devices connected to the control apparatus. The control apparatus may further be used with supplemental output devices such as printers and supplemental input devices such as fax machines, electronic pads, and keyboards.

19 Claims, 8 Drawing Sheets

FIG. 4

MEDICAL RESEARCH 2 of 7 articles

New medical findings show women over forty have a strong likelihood to be married to men over forty. In a recent article in the New England Journal of Medicine, Dr. Roy Tarpley reports that over half of his sample was married to men who have crested the hill of middle age.

Dr. Tarpley's controversial findings have sparked

PgUp △ Prev ◁◁ △ Next △▷
PgDn ▷ ◉ Exit ☐ *More* ⏸

Select Play for all messages or enter a message number.

1

APPARATUS FOR PROVIDING A GRAPHICAL CONTROL INTERFACE

CROSS-REFERENCE TO RELATED APPLICATION

This application is a continuation of U.S. Ser. No. 08/292,476 filed Aug. 18, 1994 now abandoned, which is owned by the same assignee as this application.

BACKGROUND OF THE INVENTION

1. Field of the Invention

The invention concerns apparatus for providing control interfaces generally and more specifically concerns apparatus for providing graphical control interfaces for devices which have limited display capabilities of their own.

2. Description of the Prior Art

A control interface for a machine is set of mechanisms by which the user of the machine controls the machine and receives feedback about its operation. For example, the control interface for an automobile is the brake pedal, the accelerator, the steering wheel, the gear selector, and the instruments on the dashboard. The control interface for a telephone is the keypad and the ringing and busy signals the user hears, and the control interface for a modern television set is the buttons on the television set's remote control.

Increasingly, devices ranging from the telephone network to individual devices such as answering machines, fax machines,and television sets are controlled by microprocessors. The programmability of the microprocessors has made it possible for the machines to behave in far more complex ways than was the case where control was electromechanical. A major difficulty in this development has been the continued existence of the old control interfaces. For example, the services provided by the telephone system have grown ever more complex, but the keypad has remained the same. As a result, the number of digits required to specify a service has grown longer and longer. The same is true with television sets. As more and more devices with more and more capabilities have been added to the home entertainment center, the TV remote controller has acquired ever more buttons. As crude and complex as these interfaces presently are, they have flourished. One reason for this is because millions of people use them daily, and consequently do not notice their complexity. Another is because the push-button control devices are cheap and durable. A television remote controller, for example, will survive being dropped on a concrete floor or being doused with a soft drink.

Meanwhile, computer systems came into common use. At first, their control interfaces were based on alphanumeric keyboards and alphanumeric displays: the user input an alphanumeric command from the keyboard and the response to the command appeared on the computer system's alphanumeric display. These alphanumeric control interfaces were even more difficult to use than those for the telephone system and the home entertainment center; however, as processor performance increased and memory cost decreased, even relatively inexpensive computer systems became powerful enough to support control interfaces based on graphical user interfaces (GUIs). In such control interfaces, the computer system's display includes graphical representations of objects controlled by the computer system, graphical representations of controls such as buttons or sliders, and displays of menus. Control inputs come from the keyboard, as in older systems, and from a pointing device such as a mouse or a track ball. The pointing device typically includes up to three buttons.

The pointing device is used to move a pointer on the display, and the buttons are used to indicate an action to be performed on the object at the present location of the pointer. Where alphanumeric input is required, it is provided from the keyboard. With proper design of the graphical displays and of the interactions between the pointing device, the keyboard, and the graphical display, it is possible to build powerful control interfaces for complex systems which nevertheless remain easy to learn and easy to use.

Even though GUI-based control interfaces are clearly superior to earlier control interfaces, their use has been limited to computer systems and to devices such as VCRs which are themselves capable of producing displays on a television set, and their use in the latter context has been far cruder than in computer systems. There are two reasons for their limited use: the cost of the necessary display capability and the need for users to learn a new control interface.

What is needed, and what is provided by the present invention, is a way of providing a GUI-based control interface for devices which themselves do not generate images and of providing the interface in such a way that the user does not perceive it as requiring learning.

SUMMARY OF THE INVENTION

The invention is control apparatus which uses a standard television receiver and a television controller as a control interface for devices which themselves do not have display capabilities. The controller can be used to control both the television receiver and the control apparatus. In one embodiment, the control apparatus has an interface to the telephone network and provides the control interface to telephonic devices such as answering machines or fax machines. The control apparatus may also be used to control provision of interactive and noninteractive services over the telephone network. Again, displays required for the services appear on the television receiver and input is received from the input device. Program code for the control apparatus and for devices attached to it may be downloaded from the telephone network to the control apparatus. Again, the television receiver and the input device provide the control interface.

The foregoing and other objects and advantages of the invention will be apparent to one of ordinary skill in the art who peruses the following Drawing and Detailed Description, wherein:

BRIEF DESCRIPTION OF THE DRAWING

FIG. 4: A second screen produced by the control apparatus in an information service application;

Figure 1:
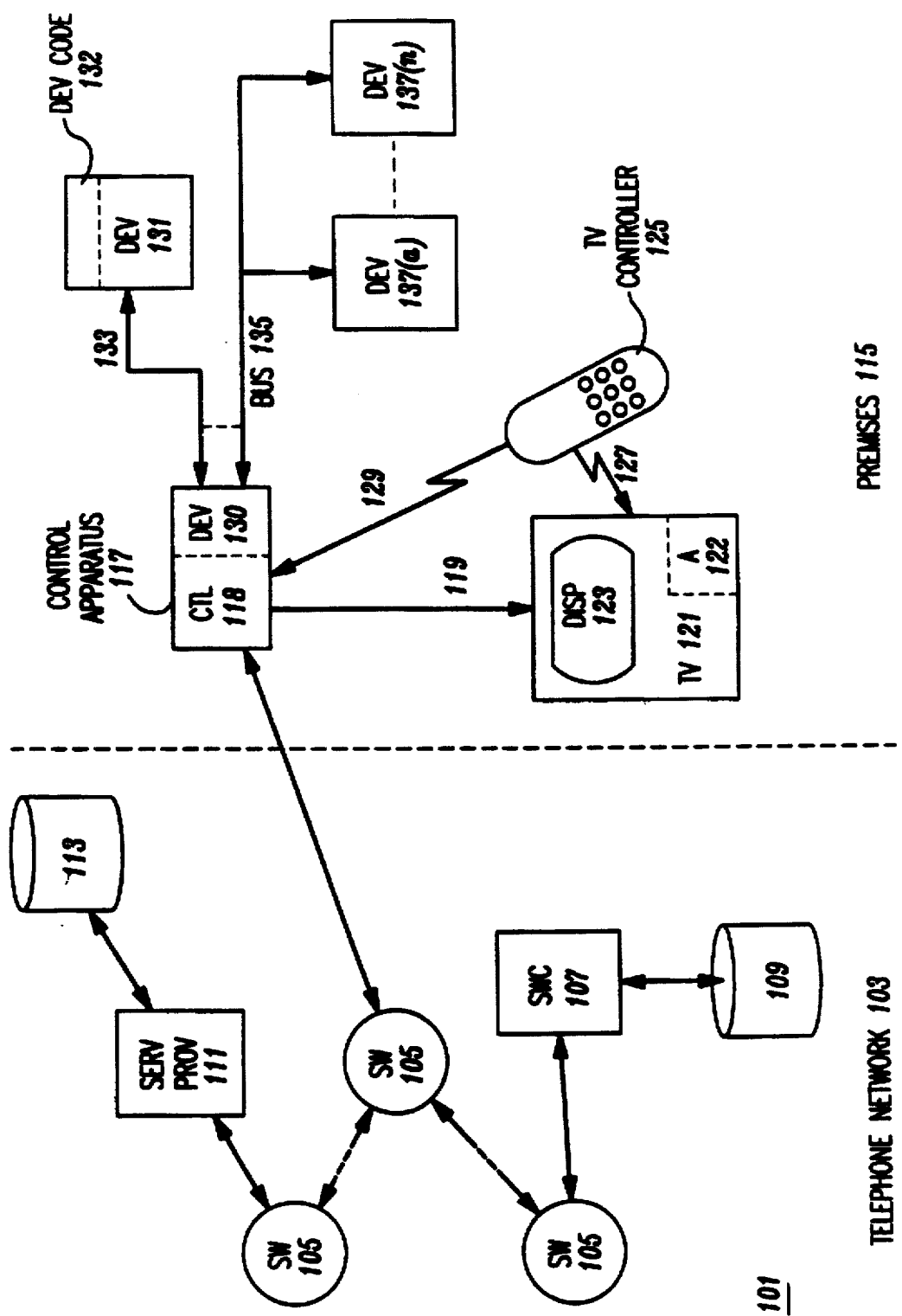
FIG. 1: Overview of the control apparatus.

The reference numbers employed in the Drawing and the Detailed Description have three or more digits. The two least significant digits are a number within a figure; the remaining digits are the figure number. Thus, the element with the reference number "305" is first shown in FIG. 3.

DETAILED DESCRIPTION

The following Detailed Description first gives an overview of a preferred embodiment of the control apparatus and of the kinds of devices and services which it can control. Thereupon, it provides details of the hardware and software used in the preferred embodiment.

Overview of a System Employing the Control Apparatus: FIG. 1

FIG. 1 presents an overview of a system which is controlled by the control apparatus of the present invention. System 101 includes telephone network 103, including switches (SW) 105 and connections between the switches, and equipment on user premises 115. Access to telephone network The equipment on user premises 115 includes control apparatus 117, which is coupled to telephone network 103, standard television receiver 121 with display 123 and audio system 122, and devices 130, 131, and 137 (a..n). Control apparatus 117 receives user inputs from TV controller 125, which also provides control inputs to TV 121. Control apparatus 117 may be coupled in any fashion to telephone network 103, including wireless connections or connections via satellite.

Devices 130, 131, and 137(a..n) are controlled by control apparatus 117 in response to inputs from telephone network 103, TV controller 125, and the devices themselves. The user control interface for control apparatus 117 is provided by television 121, which outputs control information to the user on screen 123 and audio system 122, and TV controller 125, upon which the user inputs control information. In the preferred embodiment, TV controller 125 is a wireless hand-held device. Devices controlled by control apparatus 117 may be integral with apparatus 117, as is the case with device 130, or they may be coupled to control apparatus by wired or wireless means. Device 131 has its own private connection 133, while devices 137(a..n) are connected to control apparatus 117 via a bus 135. Devices may include telephone answering machines, fax machines, printers, keyboards, sketch pads, or any other device controllable to at least some extent by digital signals.

Control apparatus 117 is coupled to telephone network 103 and receives telephone calls directed to a telephone number in network 103. Similarly, control apparatus 117 can initiate a telephone call to any telephone number accessible in network 103. Also having access to telephone network 103 are software center 107, with mass storage 109, and service provider 111, with mass storage 113. Control apparatus 117 can call software center 107 and request that software center 107 download program code for control apparatus 117 or any of the devices connected to it. The downloaded code can be code for a service provided by a service provider 111. The service may involve any other device coupled to control apparatus 117. Once the code is installed, control apparatus 117 can communicate via telephone network 103 with service provider 111 as required by the service. The code also determines the control interface for the service on TV 121 and TV controller 125.

Example of Operation of System 101

In a preferred embodiment, the physical components of control apparatus 117 are used to implement not only control apparatus 117, but also a digital answering machine, which is thus an example of an integrated device 130. In a manner which is well-known in the art, digital answering machine 130 answers incoming calls from telephone network 103 and stores any messages left by the callers. In contrast with standard answering machines, which can store only voice messages, the digital answering machine can also store character-string messages, fax messages, and script messages. The latter messages are programs to be executed by control apparatus 117. When the user of system 101 wishes to listen to his messages, he uses TV controller 125 to put TV 121 and control apparatus 117 into a mode in which input from TV controller 125 will be interpreted by control apparatus 117 instead of TV 121. In response to that input, control apparatus produces a display on television display 123 which shows what devices and services are controlled by control apparatus 117. Using TV controller 125, the user can select the desired device or service.

Figure 2:
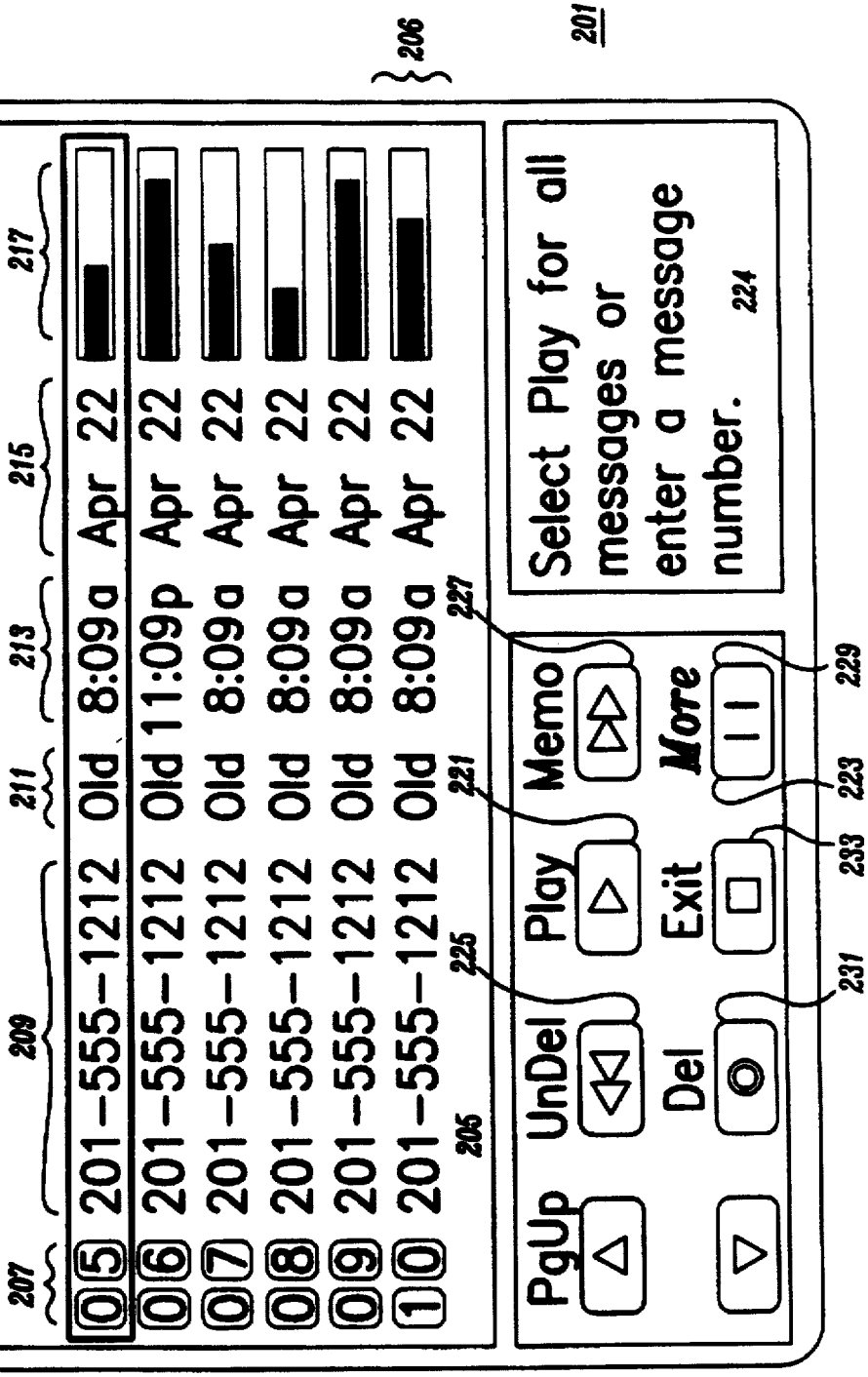
FIG. 2: A screen produced by the control apparatus in a telephone answering machine application.

If the user selects answering machine 130, control apparatus 117 outputs screen 201 shown in FIG. 2 to TV 121 for display on display 123, as shown by arrow 119. Screen 201 has four main parts:

- a header 203 which says what system display 201 belongs to and in screens for the message system, how many new messages and old messages there are.
- A list 205 of as many of the messages as will fit in the space for list 205.
- A display of the set of control buttons 219 of TV controller 125 which are active for this screen; and
- Directions 224 on how to use the screen.

Each message has an entry 206 in message list 205 which contains information about the message. The contents of the entry will vary according to the kind of service the telephone subscriber has. At a minimum, each entry contains a two-digit number 207 which identifies the message, an indication whether the message is old or new, at 211, the time and date the message was receives (213,215) and an icon indicating the kind of message. Here, icon 217 indicates that the message is a voice message. The outer rectangle indicated a period of four minutes; the dark scale inside icon 217 indicates how much of the 4 minute period is required for the message in question. If the telephone customer has caller ID service, entry 206 contains information about the caller at 209. Here, the information is the caller's telephone number; if the caller ID service provides the caller's name, the name will appear at 209. The entry 206 for the currently-selected message is highlighted.

At present, button 223, the pause button is active, as indicated by the change of appearance of its label. To play an individual message, the user uses the buttons of TV controller 125 to input the message's number 207. Control apparatus 117 then outputs the recorded message to audio system 122 of TV 121. To play all of the messages, the user presses play button 221 on TV controller 125. As indicated by the labels, the other buttons in set 219 can be used to move through list 205, delete and undelete messages, record a memo, and exit to the previous screen. If the button selected by the user requires a different screen, control apparatus 117 provides the screen.

An important advantage of the interaction between control apparatus 117 and TV controller 125 is that the screens 201 displayed on TV 121 greatly increase the usability of TV controller 125 as a control input device. First, each screen 201 shows precisely the buttons that have meaning while the screen is being displayed and also provides an idea of what a given button's function in the display is. Screen 201 thus never leaves the user in the dark concerning what buttons are presently relevant and how they are relevant. Equally important is the fact that displaying the relevant buttons in screen 201 permits control apparatus 117 to redefine the meanings of the buttons according to the context in which they are being used. For example, in screen 201, the buttons 221–233 shown in area 219 are the ones generally used in TV controllers to control the operation of a VCR or other device using sequential access media. Here, all of the buttons other than button 221 have been assigned other functions in the context of listening to messages left on answering machine 130. Since screen 201 is always present when the user is listening to his messages, the redefinition of the buttons will not result in confusion. As is clear from the foregoing, the fact that screen 201 shows both which buttons are relevant and what they do permits system 101 to employ the comfortable and well-known interface provided by TV controller 125 while greatly increasing what can be done with it. In particular, the fact that buttons can be redefined makes the addition of new buttons to TV controller 125 unnecessary.

Other Applications of System 101

Telephone network 103 can of come be the source not only of voice signals, but also of digital data representing alphanumeric characters, images, or programs. Once control apparatus 117 receives data representing alphanumeric characters or images, it can display the characters or images in a screen 201. Some examples of services which can be provided using alphanumeric characters or images received from the telephone system are e-mail (with the telephone number as the e-mail address) and various information services and incoming fax. Such services may be provided by the telephone company, but more typically will be provided by service providers 111 which have information which is accessible via telephone network 103.

Figure 3:
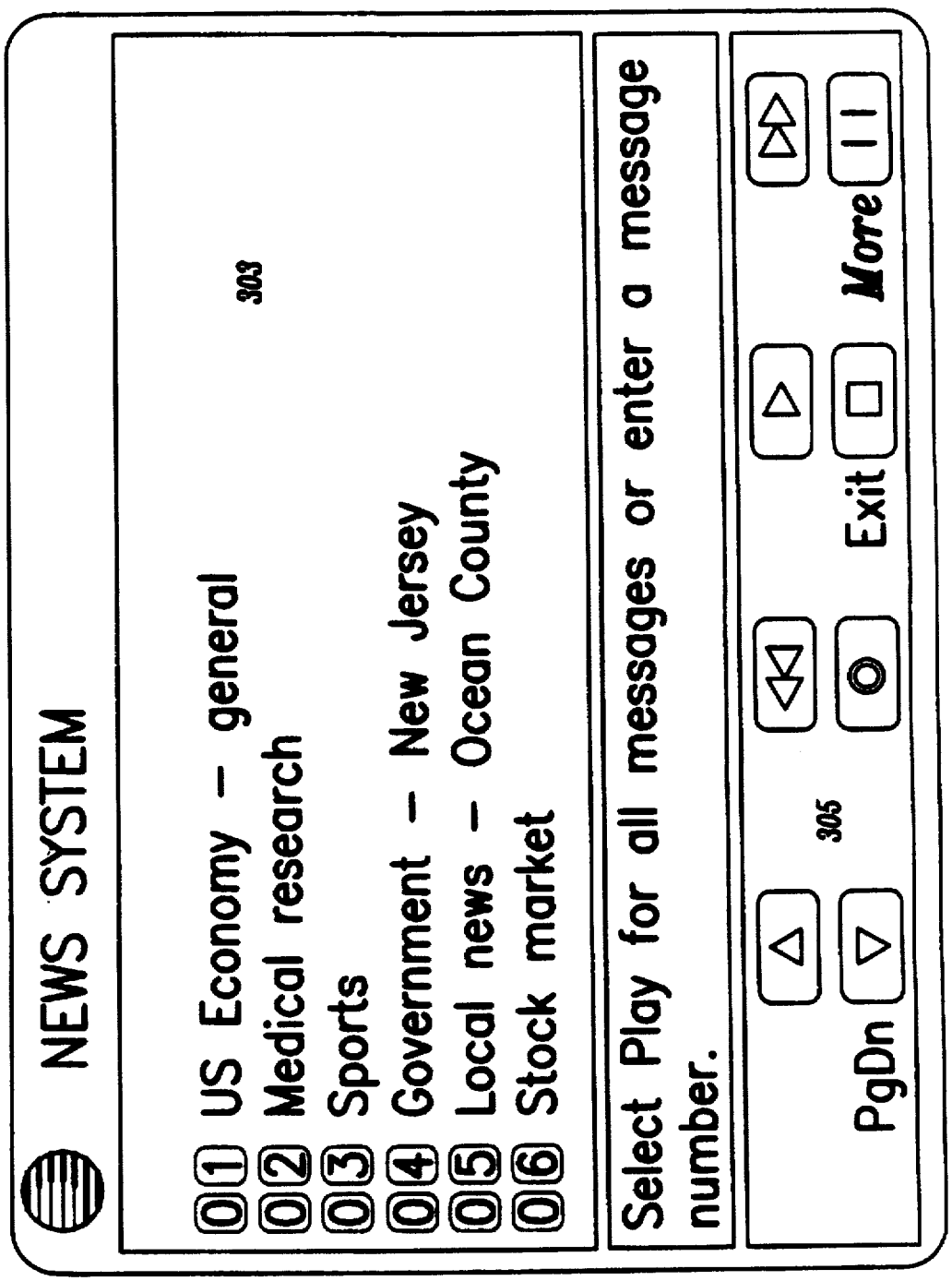
FIG. 3: A first screen produced by the control apparatus in an information service application.

A user of control apparatus 117 who wishes to subscribe to such a service can specify the service provider to control apparatus 117. The information to do this might come from a list of services to be purchased which software center 107 provides to control apparatus 117, or it might come from a telephone call or e-mail message received by the user. Having received the specification of the service from the user, control apparatus 117 uses telephone network 103 to download the program code which control apparatus 117 requires to interact with the service and generate screens for it on television 121. The program code comes from software center 107 (or in other embodiments, directly from service provider 111). Once the user has subscribed, the service appears on a screen of available services. FIG. 3 is an example of such a screen 301. Here, the user has subscribed to a variety of news services, which are listed at 303. The buttons shown in screen 301 work generally as described for screen 201, except that "playing" a message involves displaying the message's text on the display. When the user selects a news service, control apparatus 117 uses telephone network 103 to obtain the current news provided by the service from service provider 111 and then displays them on television display 123. Screen 401 of FIG. 4 shows what the user sees when he or she selects "Medical Research" from screen 301. Header 403 indicates what kind of information is being displayed and which of the available articles is being displayed. Area 405 shows a portion of the current article. The buttons indicated in area 407 can be used to navigate in the medical research information. If one of the devices in premises 115 which is coupled to control apparatus 117 is a printer or fax machine, control apparatus 117 can provide hard copy of information provided in the manner just described. The user is of course able to use TV controller 125 to select exactly what he or she wants printed.

Of course, users may desire to receive information from some services as soon as the service itself receives it. In such a service, service provider 111 can use telephone network 103 to immediately provide the information to control apparatus 117. In some embodiments, control apparatus 117 can either immediately display a message on display 123 indicating that the information has arrived or simply "take over" television 121 to display the information. Such immediate displays might also be used with information received from devices in premises 115 which are coupled to control apparatus 117. One simple example would be a microprocessor-controlled washing machine which was coupled to control apparatus 117. When it was finished with a load, it could send that information to control apparatus 117, which would flash a message indicating that fact on the TV screen.

Another such device might be a television camera in a child's room. If the child started crying, the camera could respond to the noise by sending images to control apparatus 117, which could then immediately display the images on TV 121. The same could be done with systems which detect intruders. The system could send a warning message to control apparatus 117, which could then display it, or if a television camera was part of the detection system, control apparatus 117 could display a picture of what caused the disturbance on display 123.

One kind of information which is available in telephone network 103 is program code. As previously described, control apparatus 117 can obtain the program code it requires for a service via telephone network 103; control apparatus 117 can also receive updates of code for services it already provides via telephone network 103 and can further receive updates of code for devices in premises 115 which are coupled to control apparatus 117 and then download that code to the device. For example, the maker of a micro-processor controlled washing machine might develop a new washing cycle for a new fabric or a new kind of laundry product. The maker can use e-mail to the owners' telephone numbers to inform them of the new washing cycle and of how to get program code 132 using control apparatus 117. Control apparatus 117 could then get the code from the manufacturer and download it to the washing machine.

Figure 5:
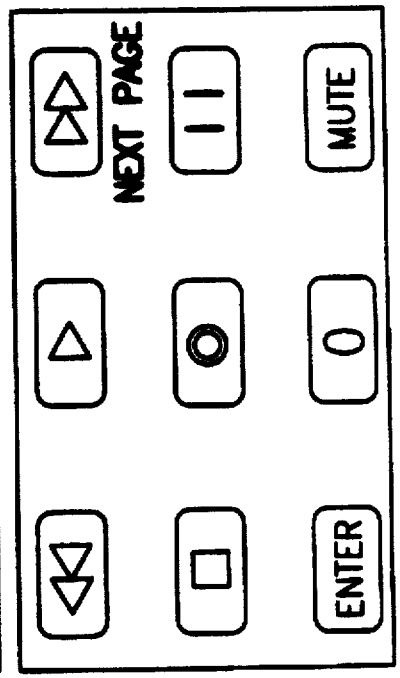
FIG. 5: A screen produced by the control apparatus in a home banking application.

With the services and devices systems described thus far, the flow of information has been essentially one way; however, telephone network 103 is bidirectional, and control apparatus 117 can send as well as receive information. One service which can take advantage of this property of system 101 is home banking. When the proper program code is downloaded to control apparatus 117, it can communicate via telephone network 103 with a bank's computer in like an automatic teller machine (ATM) does. Moreover, control apparatus 117 can generate screens and can produce screens on display 123 which are similar to those used in ATMs and the buttons on TV Controller 125 can be used in much the same fashion as the buttons on an ATM. An advantage of home banking over ATMS is that the user does not share control apparatus 117 with other bank customers and the screens appear in the privacy of the user's own home. Consequently, customer-bank interactions are possible which are more involved than those currently provided by ATMs. FIG. 5 shows an example of such an interaction. Home banking screen 501 permits the user to see not only his or her current checking account balance, but also to review the cleared checks, and thus see which of the checks is still outstanding. In effect, screen 501 provides the user with an instantaneous statement of his account's status. Using control apparatus 117, the user can also transfer money between accounts and pay bibs by electronic funds transfer.

Another example of what can be done with the two-way communication provided by telephone network 103 is a home greeting card service. Here, the service provider is a greeting card manufacturer. When the user requests the service, the provider downloads data representing cards to control apparatus 117. The data may specify an image, or it may be program data specifying an animated display. Control apparatus 117 makes a screen with the data for the card and displays it on display 123. The user employs TV controller 125 to select a card and provide a sender's name and the recipient's name. The service provider then prints the sender's name on the card and sends it to the recipient. If the recipient has a control apparatus 117, the sender's control apparatus 117 can send the card data via telephone network 103 to the recipient's control apparatus 117, which will then display the card to the user.

The two-way capabilities of control apparatus 117 are improved if the devices coupled to it include input devices. Possibilities include a microphone for voice input, an electronic sketch pad for hand printed and line drawing input, a scanner for general image input, and a keyboard for character input. The customer could use one of the input devices to add a personal message to the greeting card and sign it or could even accompany the image of the card with a voice greeting or a scanned-in photograph. Since control apparatus 117 can handle image data, voice data, character data, and program data, a message may include all four components.

Being connected to telephone network 103, control apparatus 117 can of course communicate with other control apparatuses 117. One example of such communication is the electronic greeting card service described above. Others are e-mail, games with two or more players, and forwarding of information from one control apparatus 117 to another in the same fashion that telephone calls are presently forwarded. For instance, the TV cameras previously mentioned could be used to keep an eye on older children while the parents were visiting a neighbor who had a control apparatus 117.

What can be done with control apparatus 117 is in fact limited only by the information transmission capabilities of telephone network 103, the sound and image display capabilities of television 121, and the ingenuity of the service providers 111 and users. As present-day television sets are replaced by HDTV devices and the bandwidth provided by the telephone network grows, there will be ever more possibilities. Given sufficient bandwidth in the telephone network, one possibility is movies on demand, with control apparatus 117 first providing the interface for selecting the movie and then outputting the image data received from the service provider to TV 121 for display.

DETAILED DESCRIPTION OF THE PREFERRED EMBODIMENT

The following Detailed Description will first provide details of TV controller 125, then of the hardware of control apparatus 117, and finally of the software.

Figure 6:
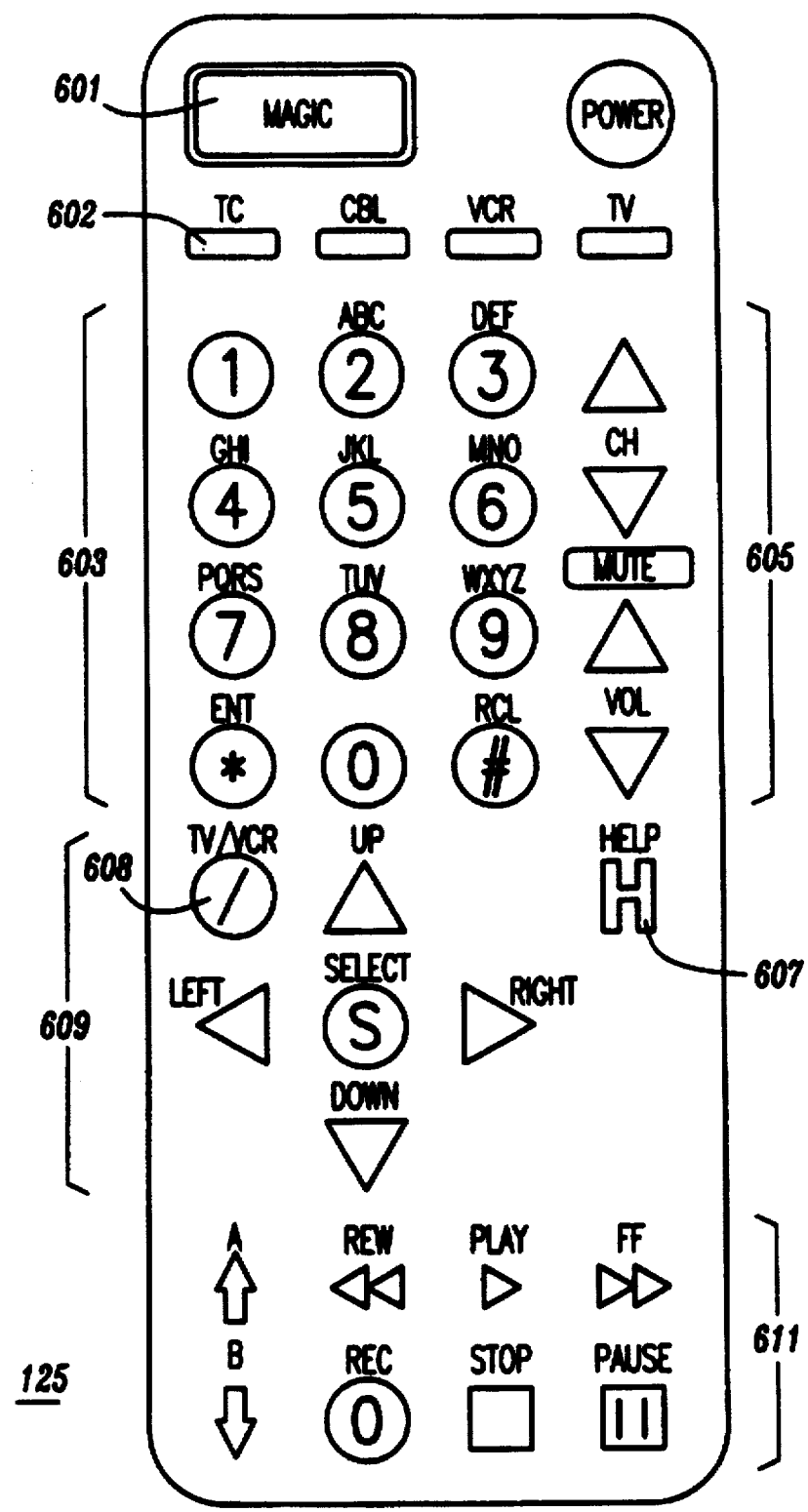
FIG. 6: The input device for the control apparatus.

TV Controller 125: FIG. 6

TV Controller 125 is a TV controller like the universal controllers one may presently purchase to control any brand of TV, VCRs, tape recorders, CD players, or others of the devices which make up a modern home entertainment center. The main difference between TV controller 125 and those otherwise available is button 602, which permits the user to specify that commands from the time button 602 is pushed until the time a button is pushed specifying another device are to be directed to control apparatus 117. TV Controller 125 responds to button 602 by encoding the commands in the form expected by control apparatus 117. In a preferred embodiment, the commands are sent as sequences of infrared pulses; in other environments, other techniques may be used for transmitting the commands.

Continuing with an overview of the functions of the buttons, button 601 is used in universal controllers to specify which devices the controller is controlling. Buttons 603 are a numeric pad which has traditionally been used to specify channels; in the preferred embodiment, the buttons can be used to input any numerical values, including telephone numbers. If a mapping is established between numerical values and letters, the buttons can be used to input letters. The "*" and "#" buttons may be used as they are in telephone keypads. Buttons 605 control audio output from the television and permit selection of channels relative to the present channel. The group of buttons indicated with 609 include four arrow buttons for navigating from one field to another in menus; the up arrow indicates the next field up, the down arrow the next field down, and so forth. The "S" button indicates selection of a field. Button 608 permits toggling between broadcast TV and the VCR and help button 607 provides help messages in systems where there are menus. The group of buttons labelled 611 are used to control operation of sequential devices such as tape recorders, VCRs, and compact disk players. As explained previously, the use of the buttons with GUI-type displays on television 121 permits redefinition of any of these keys.

Figure 7:
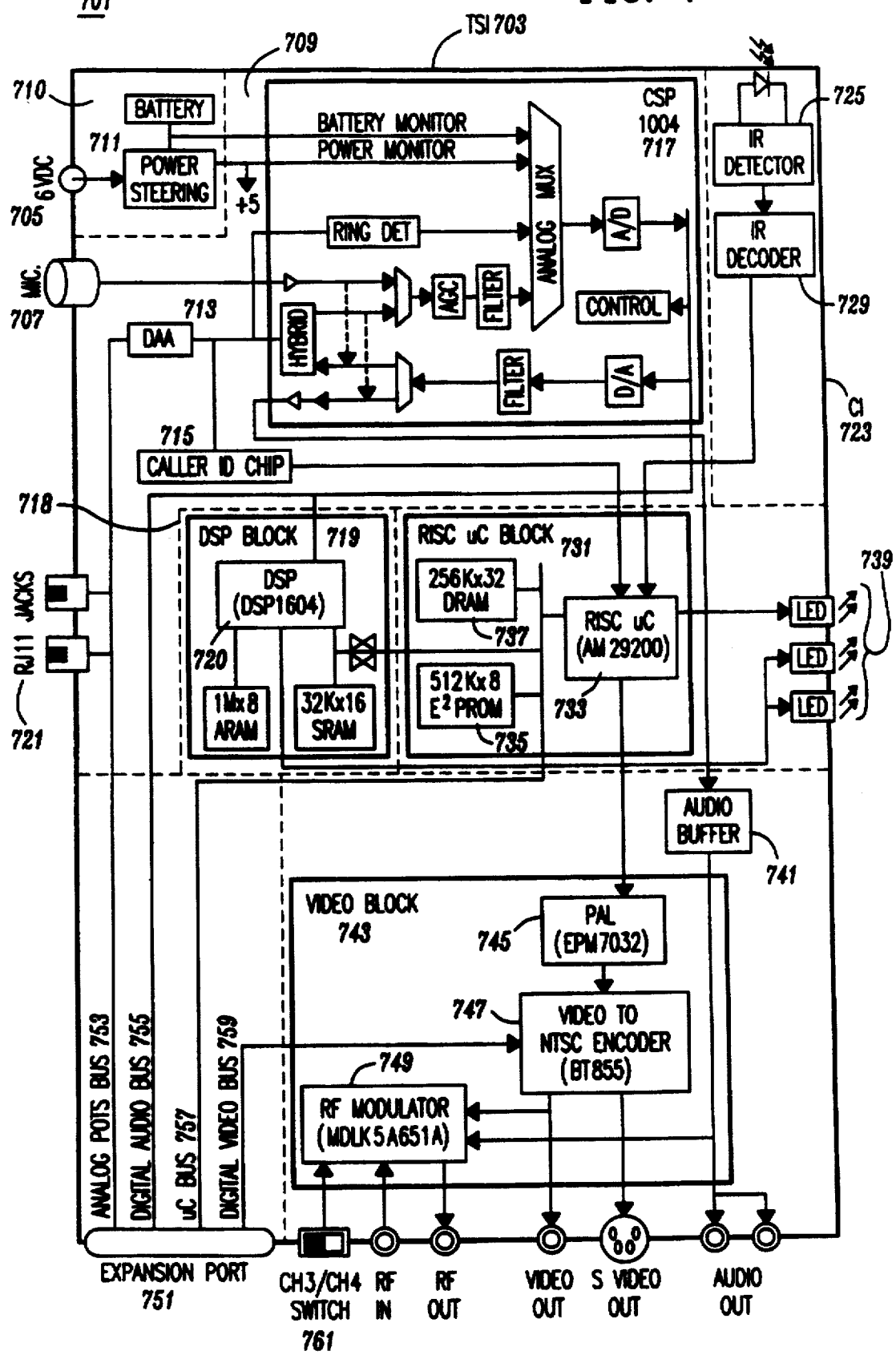
FIG. 7: Block diagram of a preferred embodiment of the control apparatus.

Details of the Hardware: FIG. 7

FIG. 7 shows the hardware employed in a preferred embodiment of control apparatus 117. In the preferred embodiment, a digital answering machine is integral with control apparatus 117 and shares many of the components. System 701 has six major components:

- Power interface 710, which is the interface to an external 6-volt power source.
- Telephone system interface 703, which contains the hardware necessary to interact with telephone network 103;
- TV controller interface 723, which contains the hardware for receiving signals from television controller 125;
- digital signal processor block 719, which contains the signal processing and storage components of the integral answering machine;
- RISC microprocessor block 731, which contains the microprocessor which controls system 701 and the microprocessor's memory;
- video block 743, which converts digital information from microprocessor block 731 into analog signals and outputs them to television 121; and
- bus interface 751, which provides connections for buses to devices external to control apparatus 117.

Beginning with power interface 710, hardware system 701 operates on 6-volt DC power 705 which is received in a preferred embodiment from an external power supply. Battery 709 is the battery backup for digital signal processor block 719. In the event of a failure of the 6-volt DC power, battery 709 provides enough backup power to preserve messages stored in digital signal processor block 719 for 24 hours. Switching between the external power source and battery 709 is done by power steering 711.

Telephone System Interface 703

Telephone system interface 703 consists primarily of CSP integrated circuit 717. CSP integrated circuit 717 is an ASIC designed by AT&T Corp. for use in digital answering machines. CSP 717 terminates the 2 wire telephone line and internally implements a 2- wire to 4 wire hybrid. The CSP has a 10 bit codec which interfaces to the serial port of DSP 720. CSP 716 has an analog mux which time division multiplexes the following analog inputs into the 10 bit A/D converter:

Telephone line or microphone input

Battery Voltage

Power supply voltage

Ring detector circuit

Each of these signals is digitized and sent to DSP 720. The telephone/microphone input from microphone 707 has automatic gain control and an anti-alias filter.

In the transmit direction, the digital voiceband samples from DSP 720 are convened to analog, filtered, and sent out on the telephone line via the internal hybrid. The 600 ohm telephone line 753 is driven directly from CSP 717, i.e. no external line drivers are required. CSP 717 can optionally re-direct or broadcast this output to a speaker driver. In the preferred embodiment, this speaker driver is coupled to Audio Buffer 741, which in turn provides audio output to the Audio Output Jacks and the sound input to the RF Modulator. DSP 720 can control CSP 717 over the serial port to select either input from telephone line 753 or from microphone 707. Similarly, selection of output to audio buffer 741 or telephone line 753 is under control of DSP 720, as is adjustment of the AGC.

The telephone system interface also includes data access arrangement 713, which is the actual electrical interface to telephone network 103, and a Motorola MC15447 integrated circuit which implements the Caller ID function. Output of the integrated circuit is to RISC uC block 731.

Television Controller Interface 723

Continuing with television controller interface 723, in a preferred embodiment, television controller 125 communicates with control apparatus 117 by means of PPM infrared pulses. The components of interface 703 are infrared detector 725, which detects the pulses, and infrared decoder 729, which decodes them. Output from decoder 720 goes to RISC microprocessor 733. In the preferred embodiment, television controller interface 723 may also receive input from an optional infrared scribbler pad or infrared keyboard. In other embodiments, there may be a single line in expansion port 751 for carrying infrared input from other devices coupled to control apparatus 117.

Digital Signal Processing Block 719

DSP Block 719 processes the digitized signals received from CSP 717 and provides digitized signals to CSP 717. Depending on what DSP Block 719 is receiving from and providing to CSP 717, DSP Block 719 implements the digital answering machine, implements a V.22 bis modem, generates and detects DTMF tones, and reports information read from CSP block 717 to RISC microprocessor block 731. It also manages the battery backup in case of power failure.

When operating as an answering machine, DSP block 719 takes the 80 Kbits/sec digital audio samples from CSP 717, compresses them to about 5 Kbits/sec, and then stores them. The compressed audio is decompressed in order to play back a message or a voice prompt. DSP Block 719 contains an AT&T DSP1604 digital signal processing integrated circuit manufactured by AT&T Corp., ARAM, i.e. DRAM, and SRAM. The DSP1604 is a low cost, 16 bit, fixed point DSP. It has a serial interface to CSP 717 and has hardware support for external ARAM such as automatic refresh. In addition, DSP 720 has a power down mode that reduces the clock to the DSP while still keeping the ARAM refreshed.

ARAM is audio RAM, that is, DRAM that has failed factory test on 25% or less of its memory. DSP 720 formats around the bad sectors when it powers up, just as is done in hard disk drives. In the preferred embodiment, the ARAM is two 1M×4 Audio-grade DRAMs. DSP 720 continues to refresh the ARAM during power failures, and consequently, the ARAM is used to store message data, including compressed voice data and data for character messages, fax, and program messages. There is sufficient space in the ARAM for approximately 20 minutes of compressed voice storage.

Two 32K×8 SRAMs are used to store the program memory of the DSP. SRAM is used instead of ROM to provide future new features with software downloads. The SRAM is loaded from EEPROM 735 of RISC processor block 731 during the first powerup of control apparatus 117 or after downloads of new software.

RISC processor 733 interfaces to DSP 720 via two 8-bit registers. One is used to send bytes while the other is used to receive bytes. RISC processor 733 initiates the transfer. Handshaking is done on a polled basis using the bit I/O registers of each processor. DSP 720 can request servicing from RISC processor 733.

DSP 720 interfaces to CSP 717 via a serial bus. Audio samples are sent and received on this bus. Battery voltage, power voltage, and telephone ring information are on this bus. In addition, the battery may be tested by having CSP 717 apply a load to the battery and checking the voltage.

RISC Microprocessor Block 731

RISC microprocessor block 731 controls all functions of control apparatus 117 and its integral digital answering machine. It generates the video display for screens 201, controls the answering machine/modem function of DSP 720, and receives commands from Command Interface 723. Major components of RISC microprocessor block 731 are RISC microprocessor 733, DRAM memory 737, and EEPROM memory 735.

RISC microprocessor 733 is an AMD 29200 RISC processor manufactured by Advanced Micro Devices. Microprocessor 733 is an 8 MIPS embedded processor that has several peripherals integrated into it.

Two 256K×16 DRAM chips are used for processor memory. Program code is initially stored in EEPROM 735, but when RISC microprocessor 733 boots up, it copies the program code to DRAM and executes it from there because of the higher performance of the 32 bit DRAM data bus versus the 8 bit EEPROM data bus.

One 512K×8 EEPROM is used to store non-volatile data/code. This memory behaves generally like ROM, but can be rewritten by microprocessor 733. In a preferred embodiment, EEPROM 735 has eight sectors, each one of which may be separately rewritten. The first step in rewriting a sector is erasing it. Erasing the sector sets every bit in the sector to "1". Once the sector is erased, microprocessor 733 may change any bit from "1" to "0", but not back. In the preferred embodiment, parts of EEPROM 735 are rewritten to update the software already in controller 117 or to add software for new services or devices. As previously explained, the new code or the updates which are written to EEPROM 735 are downloaded from software center 107 or a service provider 111 in telephone network 103. On powerup of control apparatus 117, program memory is copied from EEPROM 735 into DRAM 737 and then execution is continued from DRAM.

RISC processor 733 has a serial video port. A full picture frame of data is DMA'ed out of DRAM 737 to the video port at a 60 Hz rate, and is provided from there to video block 743. Processor 733 further receives 5-bit infrared data from controller interface 723 and caller ID bits from caller ID chip 715.

Video Block 743

The screens generated by RISC microprocessor block 731 have 360×240 pixel resolution with 4 bits per pixel. Each pixel can display one of 15 different colors out of a palette of 16 million colors. The top/bottom 12 lines and the left/right 18 pixels are not available for viewing on television display 123 because of overscan.

RISC processor 733 stores a screen in DRAM 737. The screen has 360×240 pixels and each pixel is 4 bits. This data is DMA'ed 60 times a second to the video port of RISC processor 733. A PAL device 745 is used to convert the serial video data from RISC processor 733 to the 4 bit parallel data required by Video to NTSC encoder 747. In a preferred embodiment, encoder 747 is a BT855 integrated circuit, manufactured by Brook Tree. The four-bit words represent pixels and each 4 bit pixel can represent 15 different colors selected of a palette of 16 million colors. The color currently represented by the four bits of a pixel is obtained via the overlay port of encoder 747. The palette is contained in a RAM in encoder 747, and RISC processor 733 writes the palette via a microcontroller port of encoder 747. Encoder 747 outputs analog NTSC composite or S-Video. This then goes to RF modulator 749 and to the video output jacks. Encoder 747 is also connected to digital video bus 759, and thus can display video from either RISC processor 733 or a device attached to expansion port 751.

Expansion Port Interface 751

Expansion port interface 751 permits printed circuit boards to be added to control apparatus 117 as required for it to control other devices coupled to it. The devices may be coupled to control apparatus 117 by any of the following buses:

An analog POTS bus 753. This bus is also connected to two RJ11 jacks on control apparatus 117.
Digital Audio Bus 755: the Serial data lines that connect between CSP 717 and DSP Block 719, along with their control signals, are made available on expansion port 751.
uC Bus: The address/data bus of RISC microprocessor 733 is made available. The lines have the following assignments:
  9 bits address
  8-bit data bus
  Two Chip Selects
  DMA support
  Interrupt support
  3 PIO lines
Parallel Port Bus: Control signals for a parallel port interface are made available on the expansion port connector.
Digital Video Input Bus: A 16 bit digital Luma/Chroma input video bus is provided on the expansion bus. Control apparatus 117 can overlay any portion of its DRAM 737 onto this digital video input. The bus supports 720×480 video at 30 frames/sec. This interface supports both master or slave synchronization, as well as a master or slave 27 MHz clock.

Other features of control apparatus 117 in a preferred embodiment include three LEDs 739 and channel switch 761. Two LEDs are controlled by DSP processor 720. One of these indicates whether the power is on; the other indicates a low battery. The third LED is controlled by RISC microprocessor 733 and indicates whether there are any messages in the integral answering machine. Channel switch 761 is used to select the channel which control apparatus 117 will use to output its screens to television display 123.

Examples of Operation of Preferred Embodiment 701

In the following, a number of examples of the operation of preferred embodiment 701 are given, beginning with the functions used with voice calls.

Examples of Voice Call Functions

When an incoming voice telephone call arrives on the telephone line to which preferred embodiment 601 is connected, CSP 717 digitizes the ring signal and provides it to DSP block 719. DSP block 719 provides a message indicating the presence of a ring to RISC microprocessor 733, which counts the number of rings. If they exceed a user-defined number, microprocessor 733 sends a message to DSP block 719 requesting it to answer the call. When it does so and indicates that fact to microprocessor 733, microprocessor 733 instructs DSP block 719 to provide a call answering message recorded by the user to CSP 717 for transmission to the other party. The message is stored in the ARAM. The message is followed by a tone indicating that the other party is to start recording. If the other party begins speaking, DSP block 719 receives the digitized audio signals from CSP 717, compresses them, and stores them in the ARAM. When the other party hangs up, RISC microprocessor 733 obtains the telephone number of the calling party from caller ID chip 715 and the location and length of the message in the ARAM from DSP processor 720. RISC microprocessor 733 then uses this information and the current time and date to make an entry in its list of messages in DRAM 737. The entry is then copied back to the ARAM, so that it is preserved in case of power failure.

When a user wishes to listen to his or her, messages, RISC microprocessor 733 uses the information in the list to make screen 201 in DRAM 737. Microprocessor 733 then outputs screen 201 from DRAM 737 to video block 743, which outputs screen 201 to television 121. The user then employs television controller 125 to select a message. RISC microprocessor 733 responds to the input from controller interface 723 by sending a message instructing DSP block 719 to play the selected message. The message specifies the starting address and length of the message in the ARAM. In response to the message, DSP block selects audio buffer 714 as the output for the replayed audio and then decompresses the selected message and outputs the de, compressed message to CSP 717, which converts it to analog audio and outputs it to audio buffer 741, from where it goes to the audio output and then to television 121.

It will be clear from the foregoing how other answering machine functions are implemented. When the user wishes to record a call answering message, he or she so indicates using TV controller 125, and RISC microprocessor 733 causes the corresponding screen to be output to television receiver 121. The display instructs the user to speak the message, so microprocessor 733 indicates to DSP 720 that CSP 717 is to take its input from input from microphone 707 instead of POTS bus 753. The input is digitized, compressed, and stored in the ARAM as described above, and DSP processor 720 indicates to RISC microprocessor 733 the location and length of the message. RISC microprocessor 733 in turn provides the location to DSP processor 720 when DSP processor 720 responds to an incoming call.

The answering machine further permits the user to retrieve his or her voice messages remotely. To do so, the user dials his own telephone number and then uses the keypad to input an access code to the answering machine. DSP processor 720 provides the access code to RISC microprocessor 733, which verifies it and then directs DSP 720 to set CSP 717 so that the messages are output to POTS bus 753 instead of to audio buffer 741.

Examples of Functions for Data Calls

When the call being answered by control apparatus 117 is a fax call or comes from a service such as a news service, an e-mail service, or a service such as the greeting card service which provides data, operation is substantially as described above for voice, except RISC microprocessor 733 commands DSP 720 to function as a modem instead of a compressor and decompressor of digitized audio signals. The data is carried on telephone line 753 as a sequence of audio pulses, and DSP 720 converts the sequence into the digital data it represents and passes it to RISC microprocessor 733. If the data is message contents, RISC microprocessor 733 returns the data to the DSP for storage in the ARAM. This is done to prevent loss of the message in case of a power failure. When microprocessor 733 requires the message contents to generate the screens with the text or image represented by the data on television 121, microprocessor 733 requests digital signal processor 720 to provide it with the message data. While producing the screens, microprocessor 733 stores the data in DRAM 737.

In many situations, control apparatus 117 sends data instead of receiving it. For example, many services are activated by a call initiated by control apparatus 117 in response to user input at controller interface 723. Such a call carries data to the service provider indicating who the customer is and what service is being requested. Another such example is when the user employs control apparatus 117 to send email. When control apparatus 117 is sending data, the procedure is the reverse of when it is receiving data. At the beginning of the operation, the data (including data from the user) is in DRAM 737 of RISC processor 733. RISC processor 733 commands DSP 720 to set up the call, then commands DSP processor 720 to function as a modem and provides the data to DSP processor 720. DSP 720 converts the data to digitized audio pulses, which it outputs to CSP 717 to be transmitted over the telephone line. Control apparatus 117 can of course provide data to other devices coupled to it. To do that, RISC microprocessor 733 provides the data directly to expansion port 751 via digital audio bus 755.

Downloading Program Code

In the preferred embodiment, all program code is downloaded from software center 107. When control apparatus 117 makes the call requesting code to software center 107, it includes its own serial number and the version numbers for the code presently in EEPROM 735. From this information, software service center 107 determines what parts of the code have to be changed and where the changes have to be located. The parts to be changed and instructions for making the change are then put into a package, compressed, and transmitted to control apparatus 117.

Control apparatus 117 receives the program code, DSP 720 decompresses it and passes it to RISC microprocessor 733, and microprocessor 733 uses the program code to make a new copy of the affected part of the code in DRAM 737. Microprocessor 733 then copies it from there to EEPROM 735. The copying is done in such a fashion that the old version of the code is not erased from EEPROM 735 until the new version is installed, thereby ensuring that a power failure during the installation operation does not leave control apparatus 117 inoperable. In some cases, the downloaded code will include code for DSP 720 or other devices coupled to control apparatus 117. In the case of DSP 720, RISC microprocessor 733 writes the updated DSP code to EEPROM 735 as described above and then sends the updated code to DSP 720, which loads it into DSP Block 719's SRAM. In the case of other devices, RISC microprocessor 733 receives the program code and then itself downloads it to the device in question via microprocessor bus 757.

Figure 8:
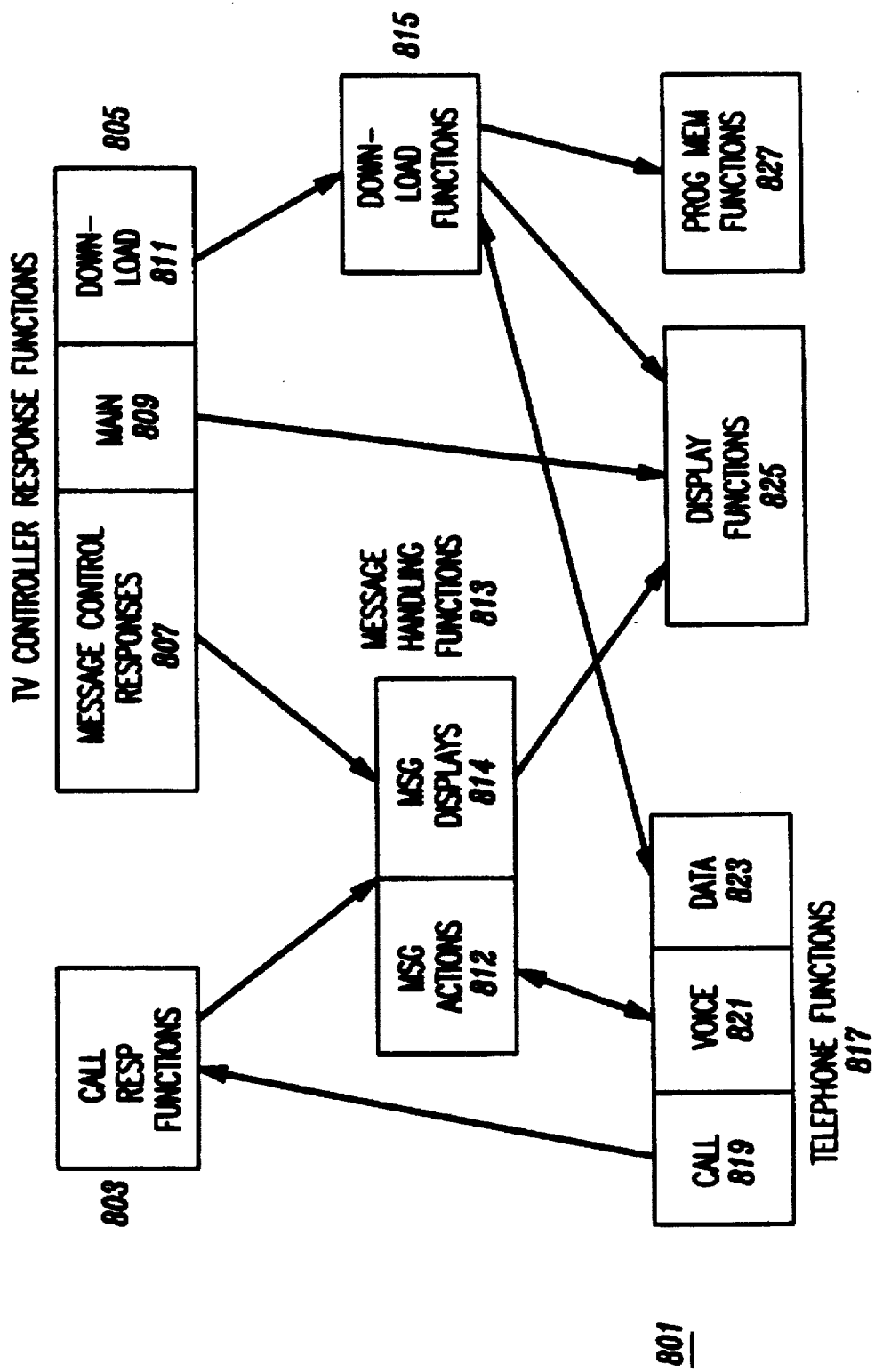
FIG. 8: Architecture of the programs for the preferred embodiment of the control apparatus.

Architecture of the Code for RISC microprocessor 733: FIG. 8

The code for RISC microprocessor 733 in the preferred environment is written in the well-known C programming language. The code is made up of a large number of small modules. Each module concerns a single entity in the software system which is created when the code is executed and contains only functions related to that entity. Some of these functions in turn require functions provided by a small number of other modules. An example is the NextMsgFunction module, which responds to the selection of the PREV button in field 407 of display 401. The module contains two functions, StopPlayer, which causes RISC microprocessor 733 to stop displaying the current message, and SelectNextMsg, which causes microprocessor 733 to select the next message. The functions employ functions provided by two other modules: MsgPlayer, which controls playing of messages, and MsgSelector, which selects messages.

The code modules are grouped into architectural subsystems. FIG. 8 provides an overview of the groupings. Each box in FIG. 8 represents a subsystem; arrows connecting the boxes indicate flow of information between the boxes in the direction indicated by the arrowheads. Beginning at the top of FIG. 8, control apparatus 117 must respond to inputs from TV controller 125 and from telephone system 103; the inputs from TV controller 125 are handled by the modules making up TV Controller Response Functions 805, while those from the telephone system are handled by call response functions 803. Call response functions 803 receive notification that a call has come in from call component 819 of telephone functions 818.

In a preferred embodiment, there is a TV controller response function for every screen which appears on television display 123. In FIG. 8, the functions are grouped according to the kinds of screens they correspond to. Message control responses 807 correspond to the screens used to control the answering machine function of control apparatus 117 and interpret inputs from TV controller 125 as required for the screens they correspond to. Main 809 corresponds to the system screen which is at the top of control apparatus 117's hierarchy of screens and interprets inputs from TV controller 125 as required for that screen; download 805 corresponds to the screens used to download code for an update or a new service and interprets the inputs from TV controller 125 as required by those screens.

At the next level, the preferred embodiment has two functional groupings of modules: message handling functions 813, which perform the functions necessary to receive and provide messages, and download functions 815, which perform the functions necessary for downloading program code. Message handling functions 813 further has two component sets of modules; one set, message actions 812, performs the actions required for the messages to be stored or output by the digital answering machine; the other set, message displays 814, produces the displays necessary to control the digital answering machine.

At the lowest level, there are the modules which deal directly with the hardware devices; these devices are DSP block 719 and CSP 717 for telephone system 103, video block 743 for television receiver 121, and EEPROM 735 for storing downloaded programs. The devices for telephone system 103 are dealt with by telephone functions 817, with component subsystems for dealing with call set up and take down (819), voice calls (821), and data calls 823. Video block 743 is dealt with by functions in display functions 805, and EEPROM 735 is dealt with by program memory functions 827.

The arrows show how information flows between the subsystems. For example, when a call is made to the telephone line to which control device 117 is attached, call modules 819 invoke functions in call response functions 819 for responding to the call. Those functions in turn invoke functions in message handling functions 813 which process the information received in the call. In so doing, functions 813 invoke functions in telephone functions 817. Which functions are invoked depend on whether the call is a voice call or a data call. When a user wishes to see his or her messages, he or she uses TV controller 125 to bring the message selection screen up on TV 125. The module in message control responses 807 corresponding to that screen then responds to inputs from TV controller 125 by invoking functions in message handling functions 813 as required to display the list of messages; these functions in turn invoke functions in display functions 825 to make the display and output it to television receiver 121.

It should be pointed out here that all that is required to expand system 801 of FIG. 8 so that it functions with other services and devices is modules in TV controller response functions 805 corresponding to the screens for those services or devices, a set of modules for doing the functions for those services, and if new hardware devices are involved, new modules for those devices.

Conclusion

The foregoing Detailed Description has disclosed to those skilled in the arts to which the disclosure pertains how one may make and use apparatus which provides a graphical user interface-based control interface with control inputs from a TV controller for devices which themselves cannot generate images. In the preferred embodiment, the apparatus is implemented integrally with a digital answering machine and is used to provide the control interface for the digital answering machine. The apparatus is, however, not limited to such an application, nor indeed to applications involving telephonic apparatus, but may be employed to give any device a GUI-based control interface. The only restriction is that the device must be coupled to the control apparatus in such a fashion that it can send control information to and receive control information from the control apparatus.

The preferred embodiment contains specialized hardware for dealing with the telephone system, and is consequently particularly adapted for providing control interfaces for telephonic devices and for services provided by the telephone system. The special features of the preferred embodiment for interfacing with the telephone system further make it easy to download program code for new devices and services to the control apparatus. In the preferred embodiment, an answering machine is integral with the control apparatus and the control apparatus is separate from the TV receiver. In other embodiments, the devices for which the control apparatus is providing the control interface may be completely separate from the control apparatus; in still other embodiments, the control apparatus may be integral with the TV receiver and buttons on the TV receiver may be used instead of a remote TV controller 125.

While the embodiment described herein is the best presently known to the inventors, it will be immediately apparent to those skilled in the art that many other implementations of the principles of the invention disclosed herein are possible. In particular, implementations which need not interact with the telephone system need have none of the components of the preferred embodiment which perform specialized telephone functions. Moreover, the RISC microprocessor disclosed herein can be replaced by any processor which has the capacity to generate displays on a television receiver. There are of course also limitless variations on the arrangement and content of the program code for the control apparatus.

As for the devices and services for which the control apparatus can provide a control interface, these are limited only by the ingenuity of mankind. In particular, embodiments which can be reprogrammed are necessarily completely protean. Reprogramming in a preferred embodiment is by downloading via the telephone system, but in other embodiments it could be done with floppy disks or additional PROMs.

All of the above being the case, the foregoing Detailed Description is to be understood as being in all cases descriptive and exemplary but not restrictive, and the scope of the invention is to be determined not from the Detailed Description, but rather from the claims as interpreted according to the full breadth permitted by the patent laws.

What is claimed is:

1. Apparatus for using a television receiver and a controller for the television receiver as a graphical control interface for a device which itself is not capable of generating a graphical display yet interacts with a telephone system, the apparatus comprising:

means coupled to the television receiver for producing a screen on the television receiver which includes at least one indication of a function involving the device;

means coupled to the device for responding to an input from the controller specifying the indication by controlling the device as required to perform the function;

means coupled to the telephone system and to the means for responding to the input from the controller for performing any interaction with the telephone system required for the function; and means coupled to the means coupled to the telephone system and the means for responding to an input for downloading program code for the apparatus from the telephone system in response to the input.

2. The apparatus set forth in claim 1 wherein:

the device is a digital answering machine.

3. The apparatus set forth in claim 2 wherein:

the digital answering machine receives voice messages from the telephone system and includes means for storing the voice messages; and means for playing the voice messages on the television receiver.

4. The apparatus set forth in claim 2 wherein:

the digital answering machine receives data messages from the telephone system and the means for producing a screen further produces a screen with at least a portion of the received data message.

5. The apparatus set forth in claim 2 wherein:

the digital answering machine receives fax messages from the telephone system and the means for producing a screen further produces a screen with at least a portion of the received fax message.

6. The apparatus set forth in claim 1 wherein:

the downloaded program code is code for a service which is provided via the telephone system and controlled by means of screens and controller inputs specified in the downloaded program code.

7. The apparatus set forth in claim 1 wherein:

the downloaded program code is code for a device which is coupled to the apparatus and controlled by means of screens and controller inputs specified in the downloaded program code.

8. The apparatus set forth in any one of claims 1, 2 through 5, 6 and 7 wherein:

the device is an integral part of the apparatus.

9. The apparatus set forth in any one of claims 1, 2 through 5, 6 and 7 wherein:

the controller is a wireless remote controller.

10. The apparatus set forth in any one of claims 1, 2 through 5, 6 and 7 wherein:

the apparatus is an integral part of the television receiver.

11. The apparatus set forth in claim 10 wherein:

the controller is an integral part of the television receiver.

12. A method of providing a service to a user of a telephone network comprising the steps of:

downloading program code to a graphical control interface device;

providing a screen specifying a selectable function of the service from the graphical control interface device coupled to the telephone network and a television receiver on the user's premises to the television receiver;

responding in the graphical control interface device to input specifying the function from a controller for the television receiver which is provided in response to the screen by specifying the function to the telephone network;

performing the function for the user in the telephone network and providing the result to the user; and responding in the graphical control interface device to the result by providing a screen displaying the result on the television receiver.

13. A method practiced in a telephone network of providing a service to a user of the telephone network, the method comprising the steps of:

downloading program code specifying a control interface involving screens displayed on a television receiver and inputs from a controller for the television receiver to control a programmable control apparatus coupled to the television receiver and the telephone network; and responding to signals produced by the control interface while executing the downloaded program code as required for the service.

14. The method set forth in claim 13 wherein:

the service is provided by a service provider accessible via the telephone network; and the step of responding to signals includes the step of establishing a connection between the service provider and the programmable control apparatus.

15. A programmable graphical control interface apparatus operably connected between and among a telephone network, a television with a screen, a controller device and a device having at least one function operative with the telephone network yet inoperative to generate a graphical display, the programmable graphical control interface apparatus comprising:

means for responding to an input from the controller device to download program code so that the controller device in conjunction with the programmable graphical control interface apparatus is programmed for causing the device to function; and means for producing a display on the television screen that includes indicia relating to the at least one function of the device.

16. A programmable graphical control interface apparatus according to claim 15, wherein the indicia include alphanumeric characters.

17. A programmable graphical control interface apparatus according to claim 15, wherein the program code is downloaded via the telephone network.

18. A programmable graphical control interface apparatus according to claim 15, wherein the device is at least one of a telephone answering machine, a printer, a keyboard and a facsimile machine.

19. A programmable graphical control interface apparatus according to claim 15, wherein the controller device is operative with the television and the programmable graphical control interface apparatus whereby causing the device to function is achieved by activating the controller device in accordance with the indicia displayed on the television screen.

* * * * *